Sept. 23, 1958     S. D. SILLIMAN ET AL     2,853,697
LOGIC-ELEMENT DECIMAL REGISTER Filed July 31, 1957     12 Sheets-Sheet 1

WITNESSES:

INVENTORS
Sheldon D. Silliman and
Willard A. Derr.
BY
ATTORNEY

Fig. IC.

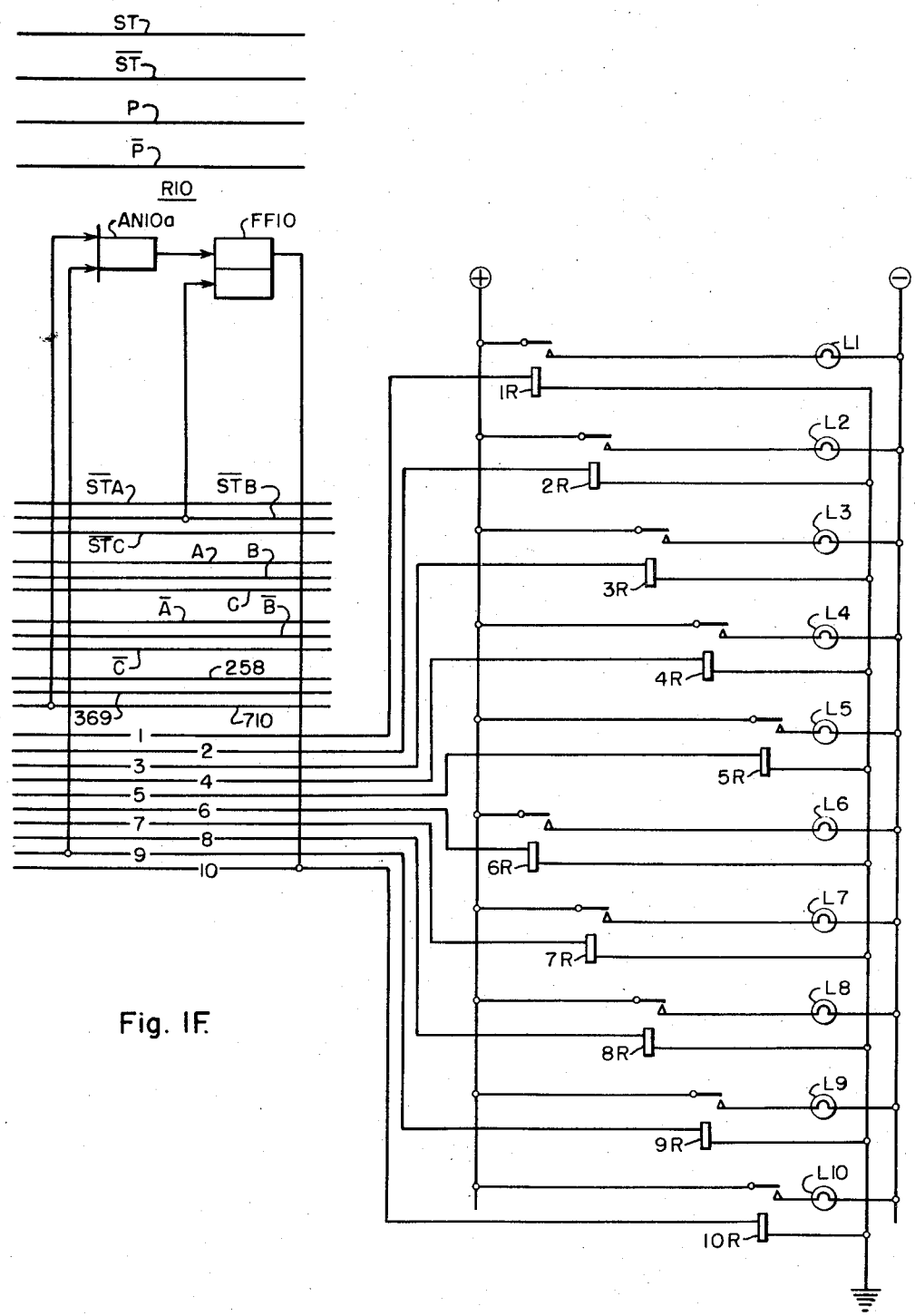
Fig. IF.

Sept. 23, 1958    S. D. SILLIMAN ET AL    2,853,697
LOGIC-ELEMENT DECIMAL REGISTER
Filed July 31, 1957    12 Sheets-Sheet 12

United States Patent Office 2,853,697
Patented Sept. 23, 1958

2,853,697

LOGIC-ELEMENT DECIMAL REGISTER

Sheldon D. Silliman, Forest Hills, and Willard A. Derr, Pittsburgh, Pa., assignors to Westinghouse Electric Corporation, East Pittsburgh, Pa., a corporation of Pennsylvania Application July 31, 1957, Serial No. 675,409

10 Claims. (Cl. 340—173)

Our invention relates generally to pulse registers and it has reference in particular to a static logic-element decimal pulse register.

Generally stated, it is an object of our invention to provide a static-element pulse register that is simple and inexpensive to manufacture, and is reliable in operation.

More specifically, it is an object of our invention to provide in a decimal register for using static logic elements.

Another object of our invention is to provide in a decimal pulse register for using magnetic-amplifier logic elements.

It is another object of our invention to provide in a decimal pulse register for using transistor logic elements.

It is also an object of our invention to provide in a static decimal register for using a plurality of static Flip-Flop memory elements and for triggering them in succession in response to a start signal and successive pulse signal.

It is an important object of our invention to provide in a logic decimal pulse register for using a continuous start signal together with intermittent pulse signals.

Another important object of our invention is to provide in a decimal pulse register for using with a plurality of static memory devices in sequence, transfer means each comprising a static memory circuit device and a static Not circuit, for successively operating the memory circuits of the register in response to successive pulses to be counted.

Other objects will, in part, be obvious and will, in part, be explained hereinafter.

In practicing our invention in accordance with one of its embodiments a decimal pulse register comprises ten successive register stages, each consisting of a static Flip-Flop memory circuit triggered by an And circuit and reset by an Or circuit. Three interstage transfer circuits are used in sequence with the register stages, each consisting of a Flip-Flop triggered by an And circuit from the preceding register stage to apply a signal to the succeeding register stage and to a static Not circuit. A continuous start signal is applied to each of the register And circuits together with each pulse to be counted, for progressively operating one register stage after another to produce output signals. Not circuits associated with the pulse and start signals are utilized to apply to the transfer stages and to register Flip-Flop Not signals to register the end of each pulse, and to reset the register stages respectively.

For a more complete understanding of the nature and scope of our invention reference may be made to the following detailed description which may be read in connection with the accompanying drawings in which:

Figs. 1A through 1F arranged in order from left to right provide a schematic diagram of a magnetic-amplifier logic decimal register;

Figure 8:
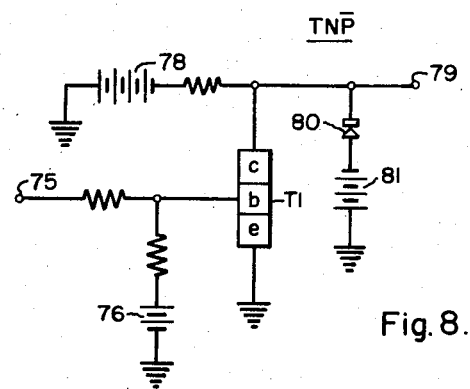
Figure 7B:
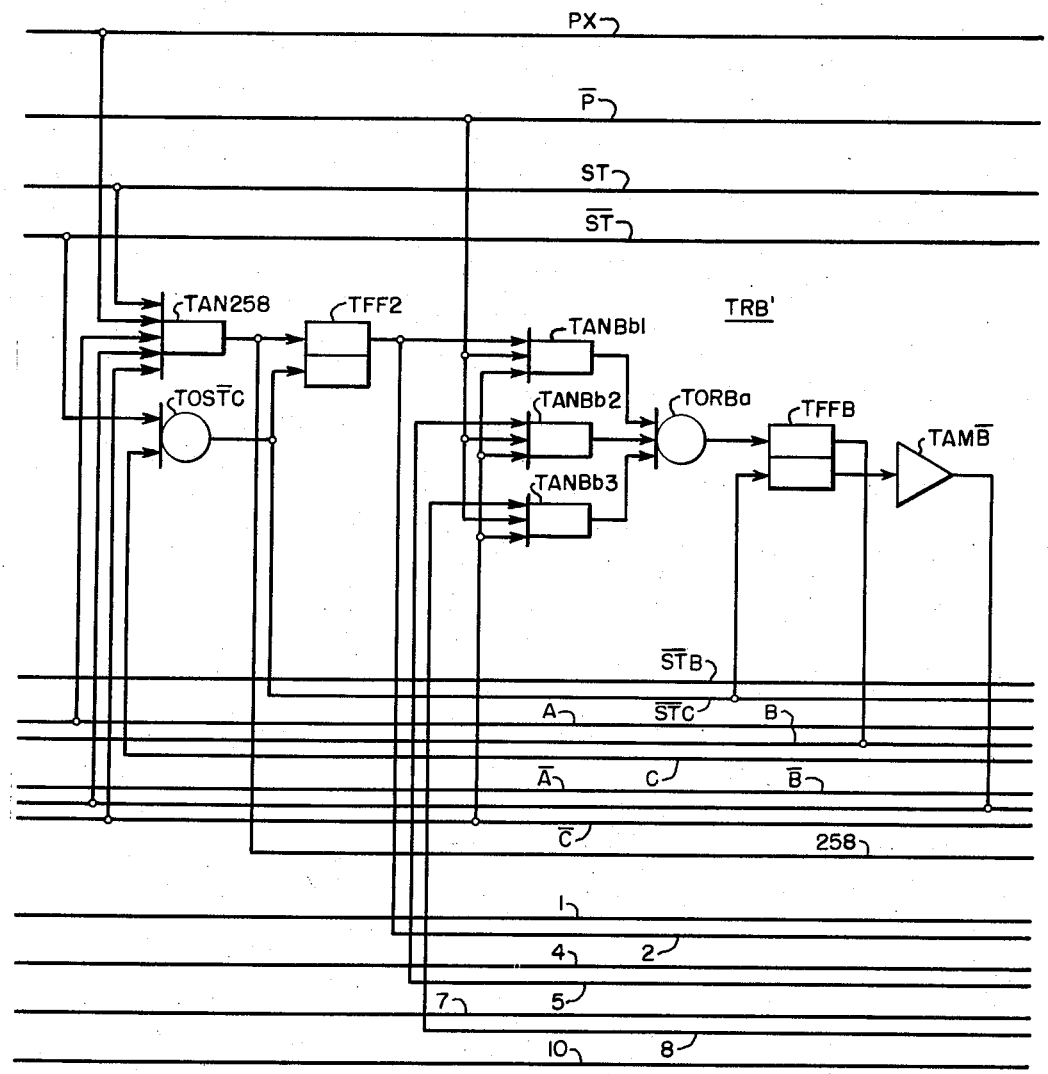
Figure 9:
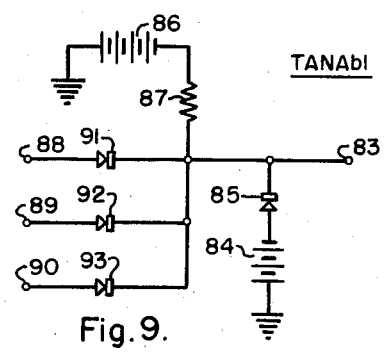
Figure 7C:
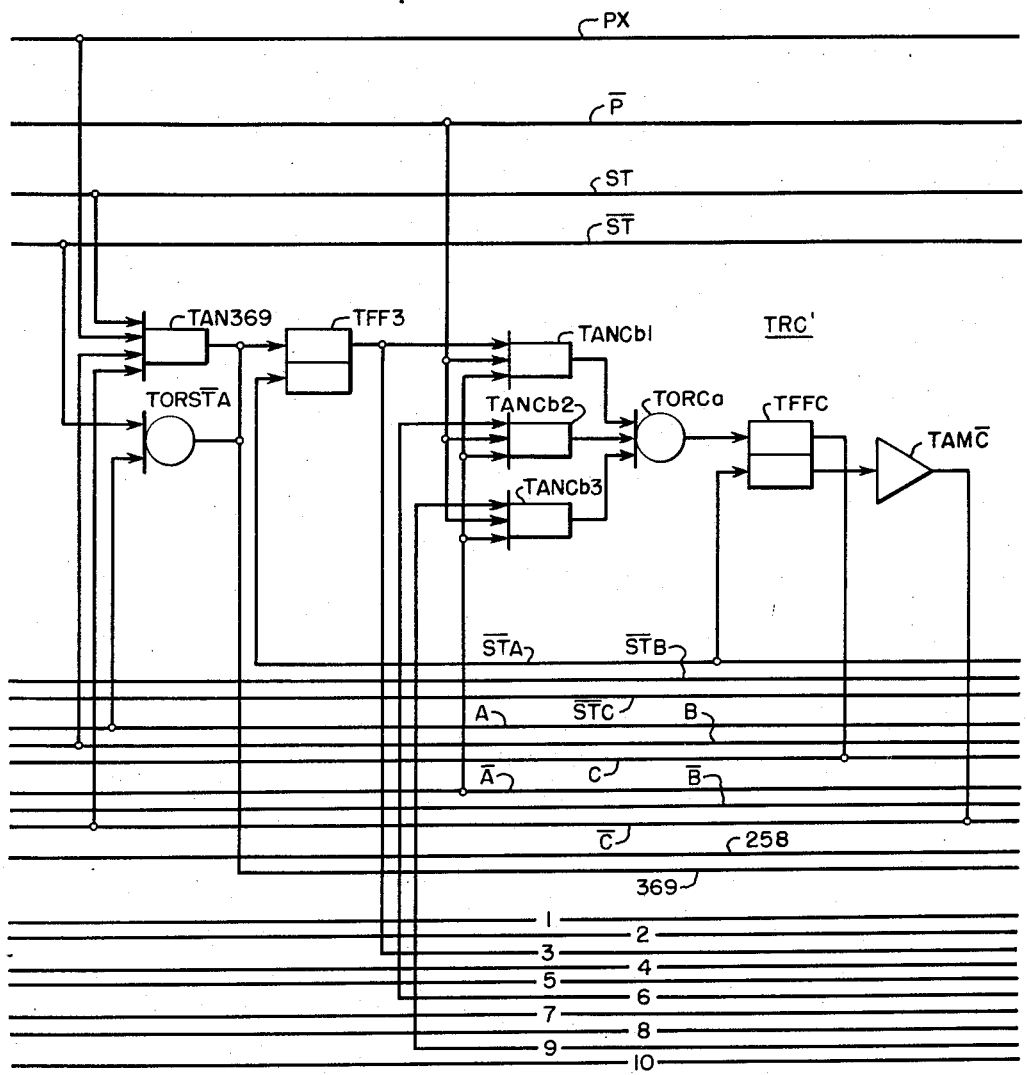
Figure 10:
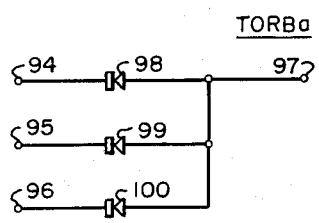
Figure 7D:
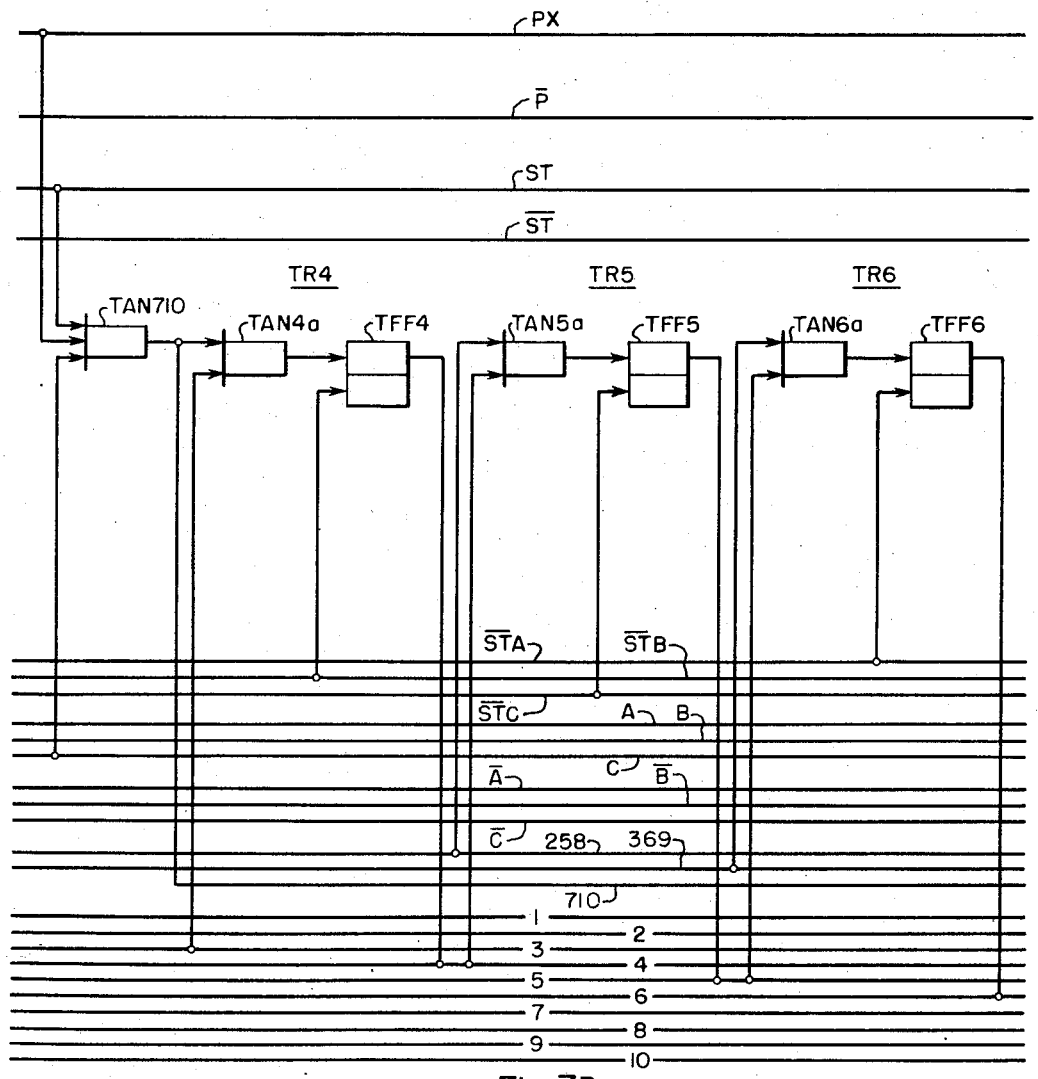
Figure 11:
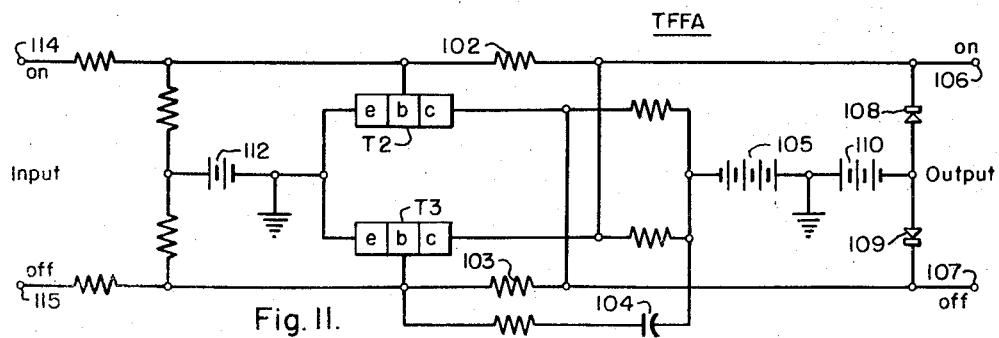
Figure 7E:
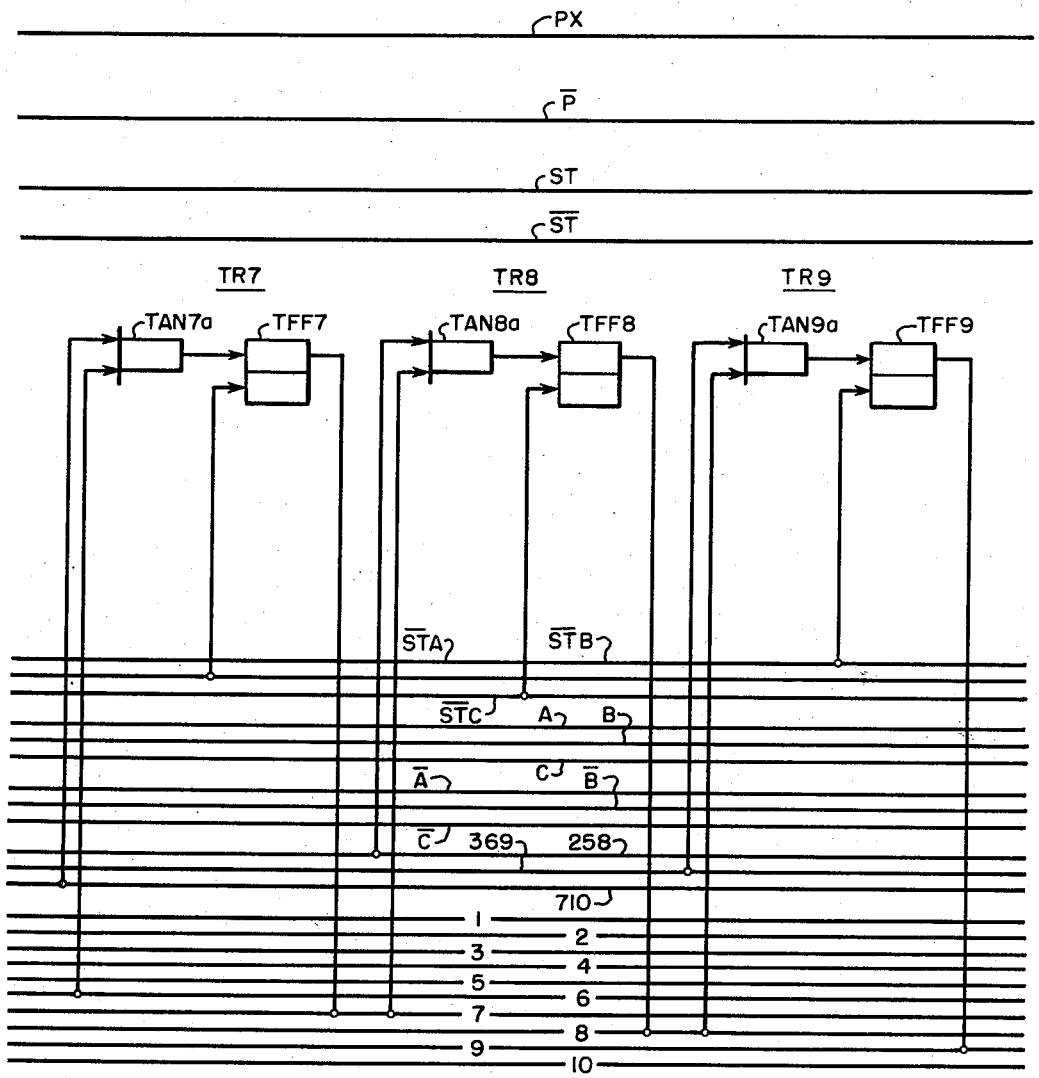
Figure 12:
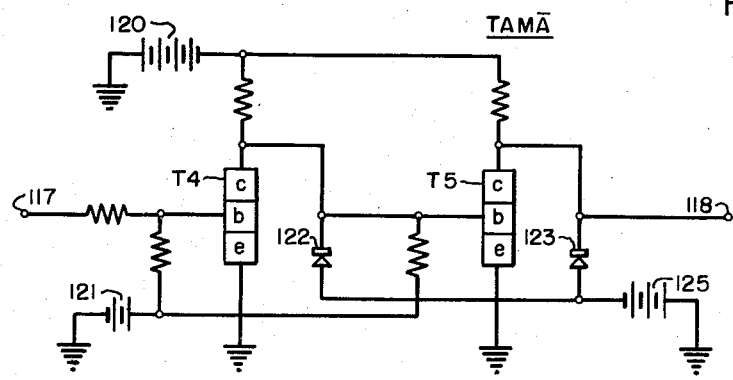
Figure 7F:
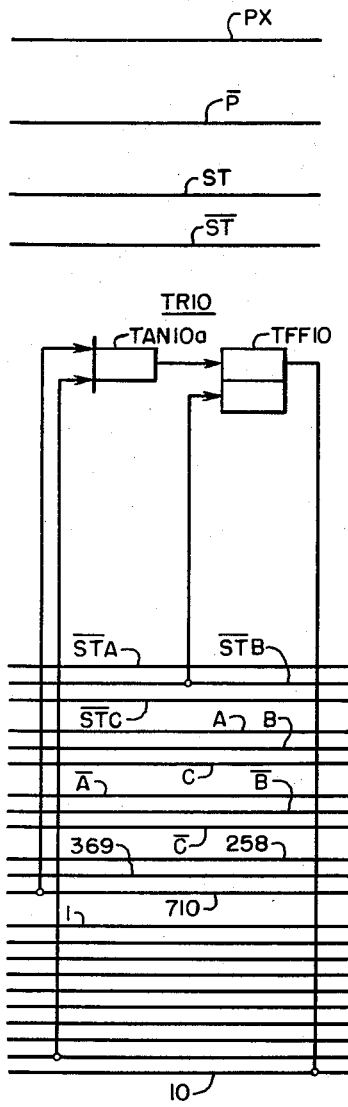
Figure 13:
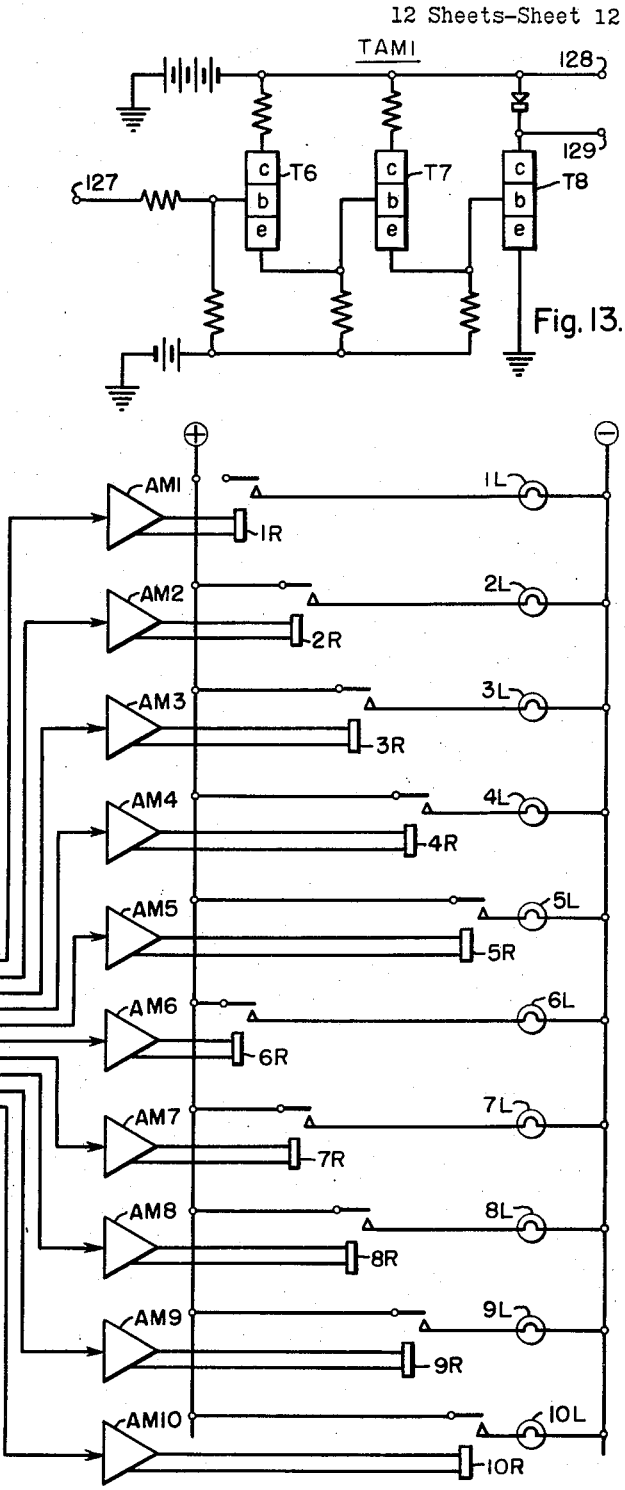

Figs. 7A through 7F arranged in order from left to right provide a schematic diagram of a decimal pulse register circuit using transistor logic;

Fig. 8 is a schematic diagram of a Not circuit such as used in Figs. 7A-7F;

Fig. 9 is a schematic diagram of an And circuit such as used in Figs. 7A-7F;

Fig. 10 is a schematic diagram of an Or circuit such as used in Figs. 7A-7F;

Fig. 11 is a schematic diagram of a Flip-Flop circuit such as used in Figs. 7A-7F;

Fig. 12 is a schematic diagram of a Not-Not amplifier such as used in Figs. 7A-7F; and Fig. 13 is a schematic diagram of a relay amplifier such as used in Figs. 7A-7F.

As used herein, a Flip-Flop or memory circuit is a static circuit element which provides an output signal in response to a first condition, which output signal continues even though said first condition ceases to exist, and terminates said output signal in response to a second condition.

An Or circuit is a circuit using static elements which provides an output signal in response to any one of a plurality of input signals.

An And circuit is a circuit using static elements, which provides an output signal only when all of a plurality of input signals are applied.

A Not circuit is a static circuit element which provides an output signal only in response to the absence of an input signal. A Not signal is designated hereinafter by a "—" above the particular signal designation so that a Not A signal is represented by $\overline{A}$.

Referring to Figs. 1A through 1F, the magnetic amplifier decimal pulse register comprises 10 pulse register stages R1 through R10 which are operated in sequence with interstage transfer stages TRA, TRB, and TRC in response to successive pulses to be contained. For the purpose of illustration, the pulse signals are represented as being produced by a pulsing switch PS which connects a pulsing bus P to a source represented by the positive terminal mark. Along with the pulse signals a start signal is applied to the register, being represented by a start switch STS which connects a start signal bus ST to the source. Not circuits NP and NST are provided for producing $\overline{P}$ and $\overline{ST}$ signals when signals P and ST are absent.

Basically, each of the register stages comprises a Flip-Flop memory circuit designated FF1 through FF10, respectively, triggered to the on condition by an And circuit element AN1a through AN10a. Each of the register stages R1 through R3 is provided with an Or circuit $\overline{OSTB}$, $\overline{OSTC}$, and $\overline{OSTA}$, respectively, for triggering them to the off condition. The other register stages R4 through R10 are sequentially triggered to the off condition by output signals from the same Or circuits. The register stages R2, R3, and R4 are each provided with additional And circuits AN258, AN369, and AN710, respectively, for applying signals to their respective And circuits as well as to the And circuits of succeeding register stages as indicated by the numerical designations (for example, stages R5 and R8 in addition to R2 for AN258). For example, the And circuit AN258 has input circuits connected to the start bus ST, to the pulse signal bus P, to an A bus energized from the output of Flip-Flop FFA, to a Not bus $\overline{B}$ and to a Not $\overline{C}$. The And circuit AN369 has input circuits energized from the start bus ST, from the pulse bus P, from the B bus energized from the transfer stage TRB and the $\overline{C}$ bus energized from the transfer stage TRC. The ouput from AN369 is applied to the And circuit of register stages R3, R6, and R9. The And circuit AN710 likewise has input circuit energized from the ST bus, from the P bus and from the C bus. The ouput of this And circuit is applied to register stages R4, R7, and R10.

The transfer stages TRB, TRC, and TRA each comprise a Flip-Flop memory circuit designated FFB, FFC, and FFA, respectively. These memory circuits are triggered by And circuits ANB*b*, ANC*b*, and ANA*b*. These And circuits are energized by a Not P signal $\overline{P}$ obtained from the P bus through a Not circuit NP from Or circuits OB*a*, OC*a*, and OA*a*, respectively, as well as from a $\overline{C}$ bus, an $\overline{A}$ bus and a $\overline{B}$ bus, respectively. Each of the transformer Flip-Flop circuits has a Not circuit NB, NC, and NA, respectively, associated therewith for producing a Not signal $\overline{B}$, $\overline{C}$ and $\overline{A}$ when the Flip-Flop is in the off condition.

Signals from the register stages R1 through R10 are applied to the buses 1 through 10, which are shown connected to relays 1R through 10R for operating indicating lamps L1 through L10, respectively, in response to ouput signals being applied to the signal buses. This arrangement is shown for purposes of illustration only, and it is realized that the signals from the register buses may be utilized in any suitable manner to operate different types of indicating or register devices as desired.

Figure 1A:
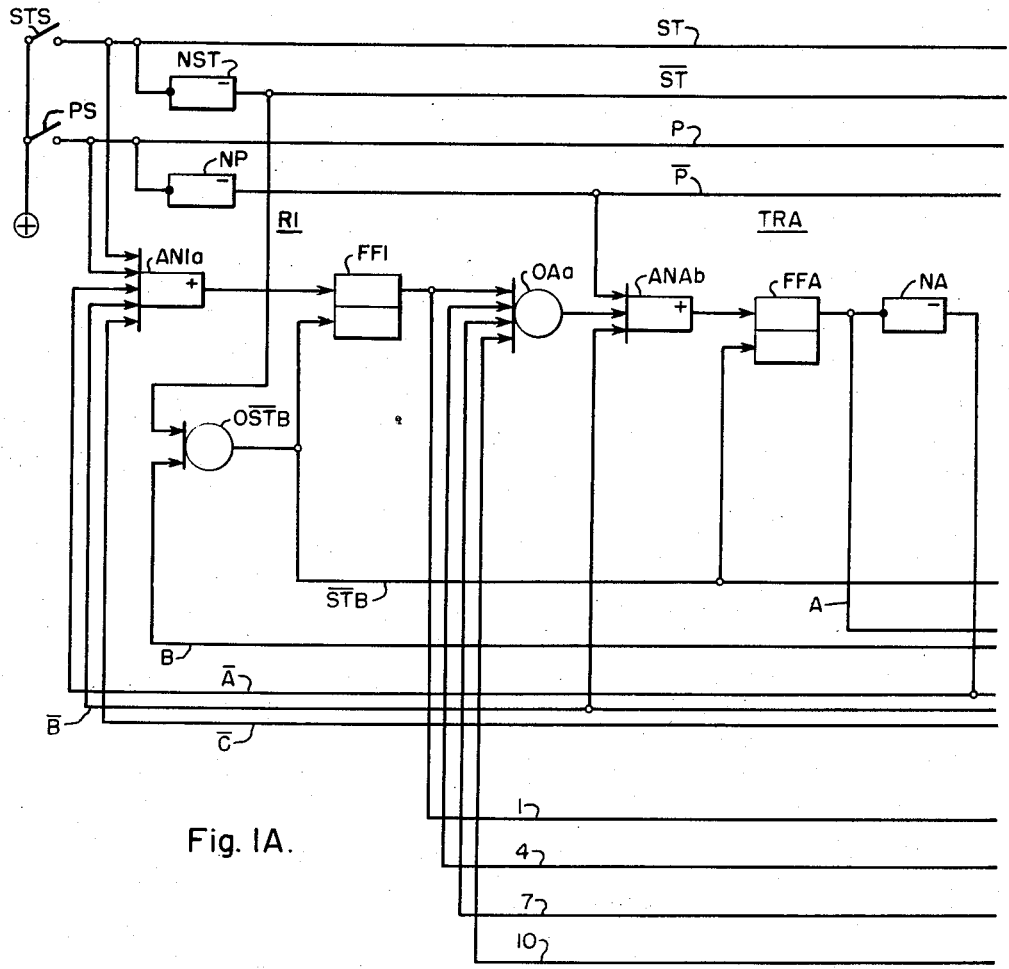
Figure 2:
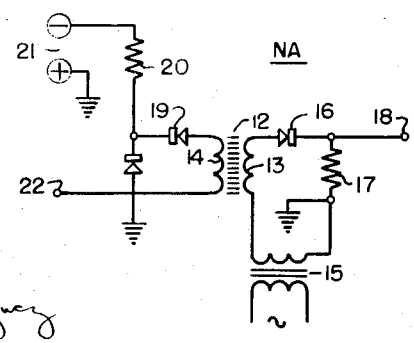
Fig. 2 is a schematic diagram of a Not circuit such as used in the circuit of Figs. 1A-1F.
Figure 1B:
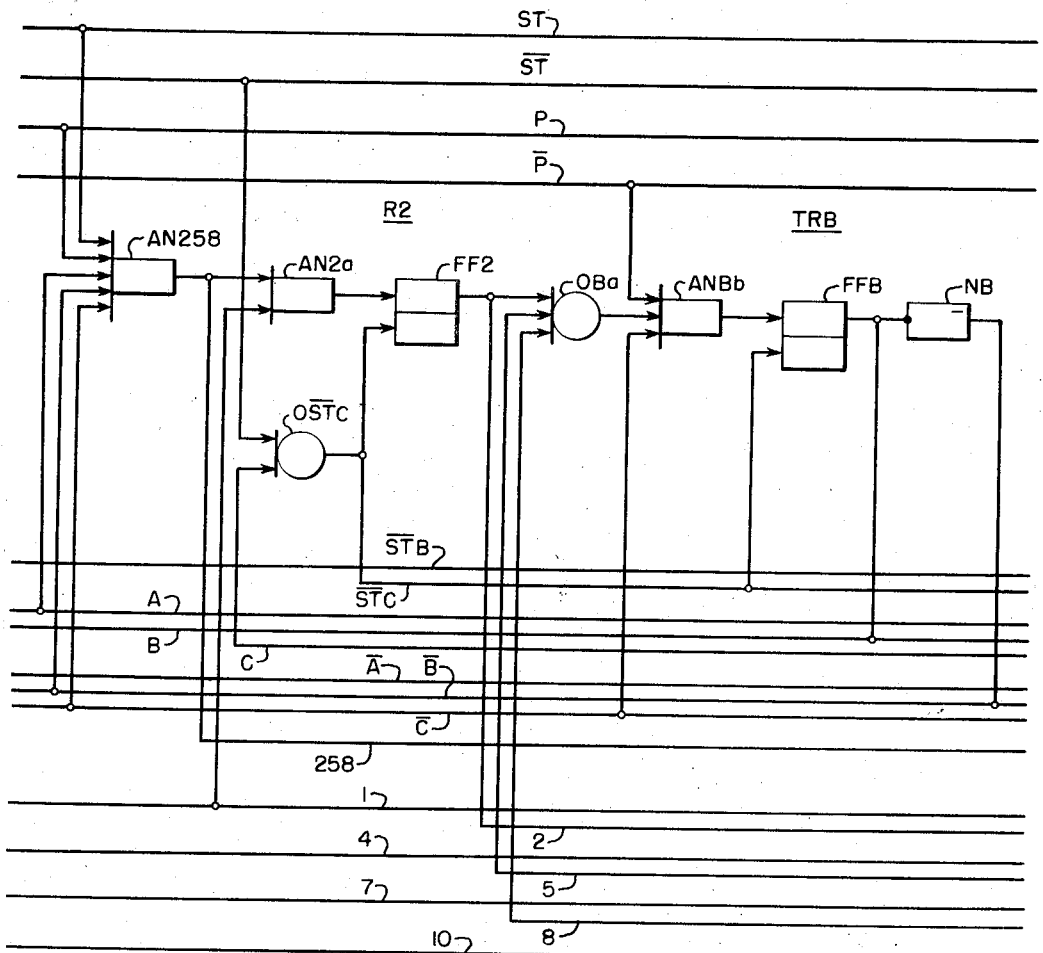

Referring to Fig. 2, the Not circuit NA, which is typical of the several Not circuits used, is shown in detail as comprising a saturable magnetic core 12 having output and reset windings 13 and 14, respectively. The output winding 13 is energized from an alternating current source through a transformer 15, a rectifier 16 and an output resistor 17 for producing an output signal at the terminal 18 when the core 12 is saturated. The reset winding 14 is connected through a rectifier 19, a resistor 20 and a battery 21 to provide a non-linear magnetizing circuit. A reset signal can be applied to the terminal 22 for resetting or effecting reverse saturation of the magnetic core 12 to prevent gating of the ouput, as explained more fully in Patent No. 2,752,510 which issued on June 26, 1956, to William G. Hall.

Figure 3:
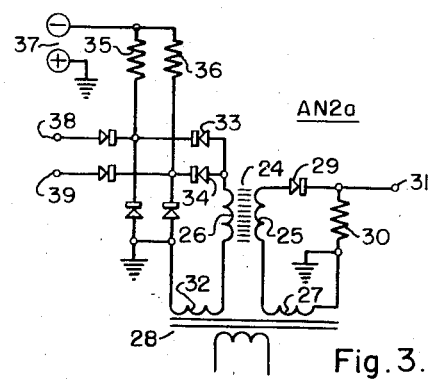
Fig. 3 is a schematic diagram of a two-input And circuit such as used in Figs. 1A-1F.

Fig. 3 shows details of the circuitry of And circuit AN2*a*, which is typical of the several two-input And circuits of Fig. 1. This circuit corresponds basically to the circuit described by R. A. Ramey, Jr., in Patent No. 2,783,315 which issued on February 26, 1957, and comprises a magnetic core element 24 having an output winding 25 and a reset winding 26. The output winding 25 is connected to a source of alternating current through one winding 27 of a transformer 28 in circuit with a rectifier device 29 and an output resistor 30 for producing an output signal at the terminal 31 when the core 24 is saturated. The reset winding 26 is connected to another winding 32 of the transformer 28 in circuit with a pair of non-linear circuits including rectifier devices 33 and 34, resistors 35 and 36 and a battery 37 for normally providing circuits for a reset current to reset the flux in the magnetic core 24 and prevent gating of the output winding 25. When signals are applied to the input terminals 38 and 39, both of these reset circuits are blocked, and reset is prevented, so that an output signal can occur at terminal 31.

Figure 4:
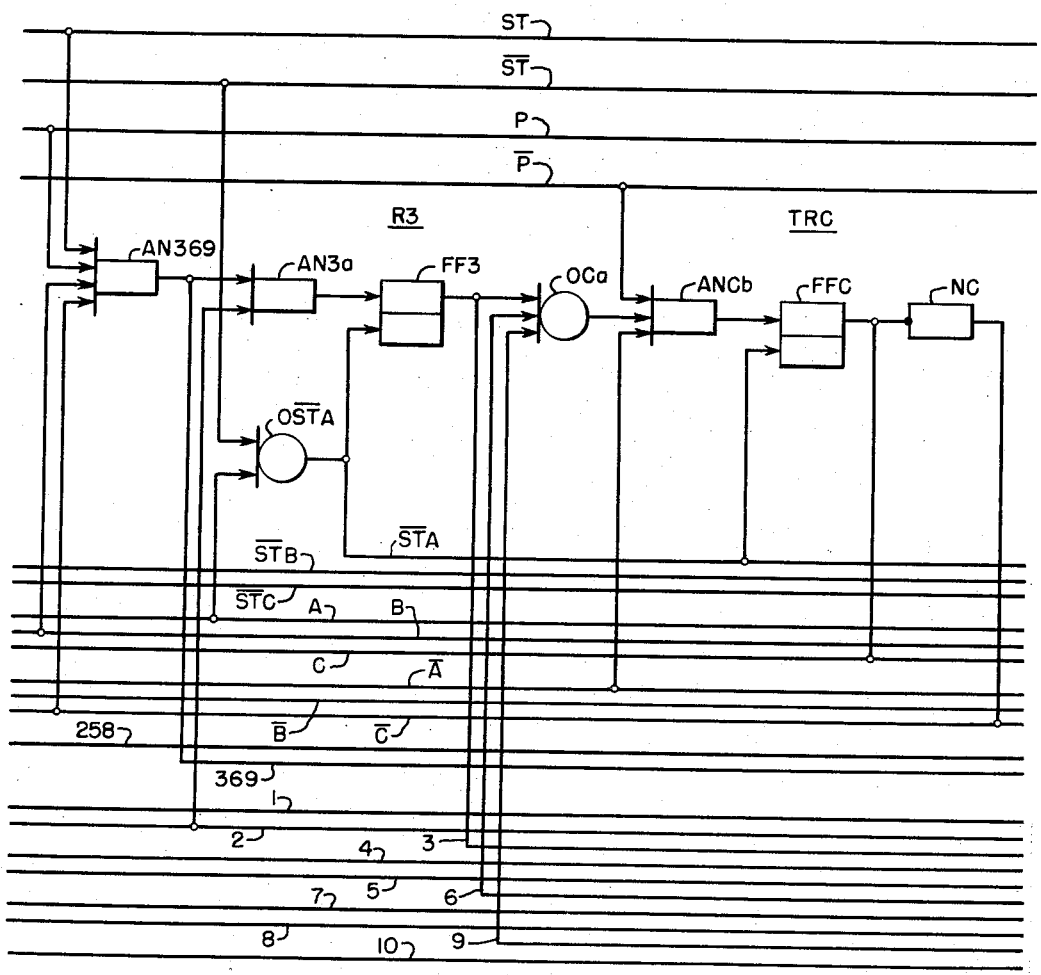
Fig. 4 is a schematic diagram of a three-input And circuit such as used in Figs. 1A-1F.
Figure 4:
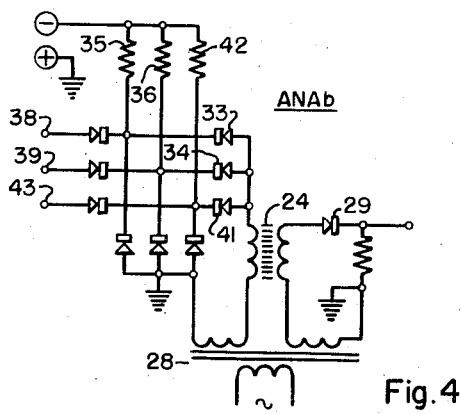
Figure 1D:
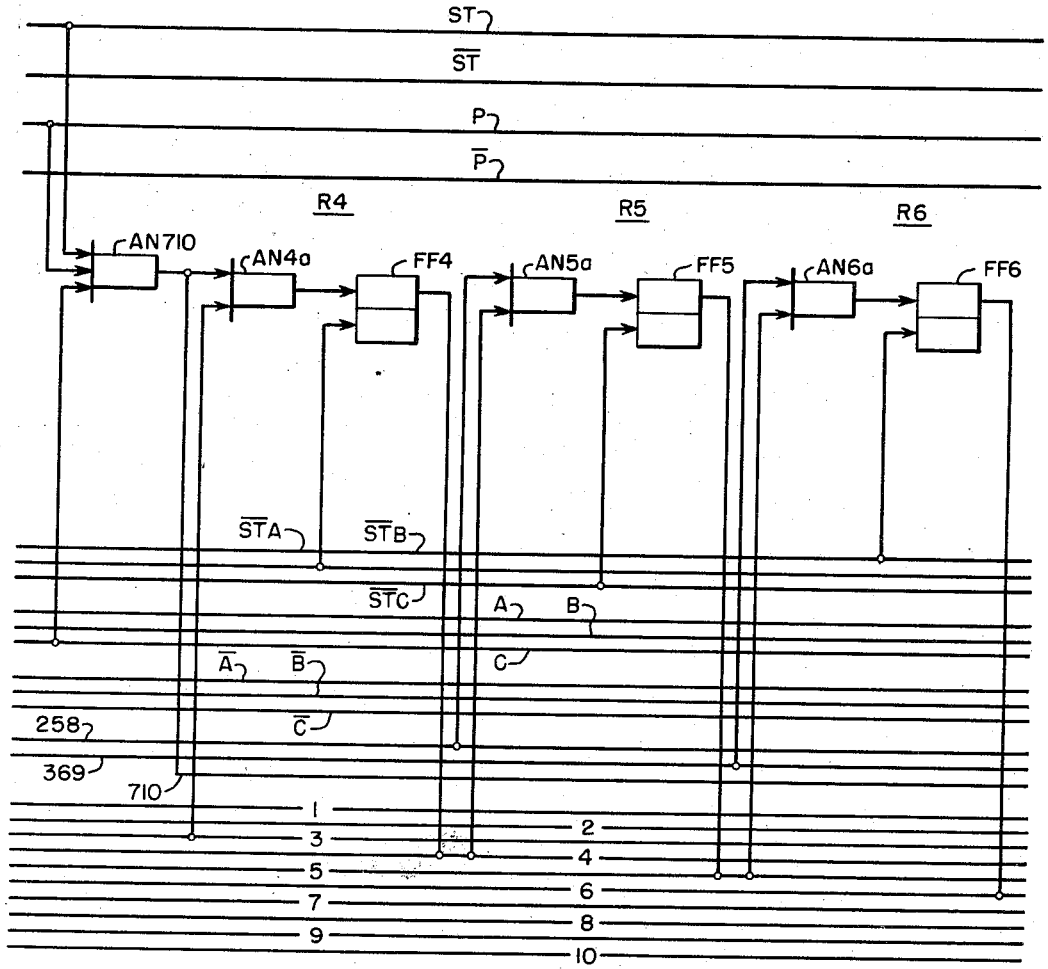

Referring to Fig. 4, a schematic diagram of And circuit ANA*b* is shown. This circuit is similar to the circuit of Fig. 3 except that an additional reset circuit has been provided comprising rectifier device 41 and resistor 42 in parallel with the other reset circuits. An additional input terminal 43 is connected therewith for applying a blocking voltage to this reset circuit but otherwise the circuit is identical with that described in connection with Fig. 3.

Figure 5:
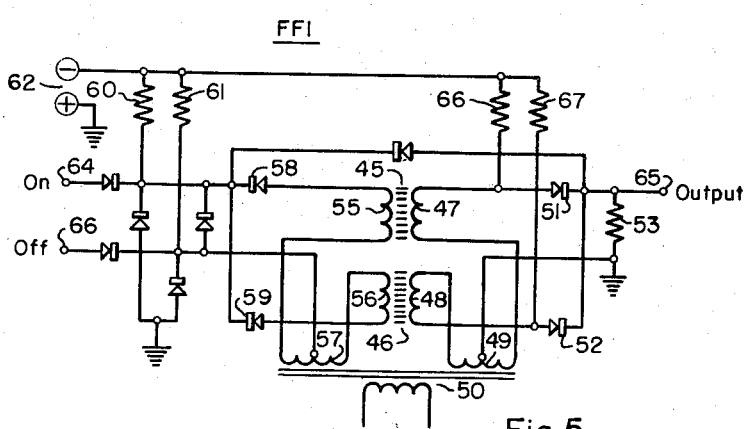
Fig. 5 is a schematic diagram of a Flip-Flop circuit such as used in Figs. 1A-1F.
Figure 1E:
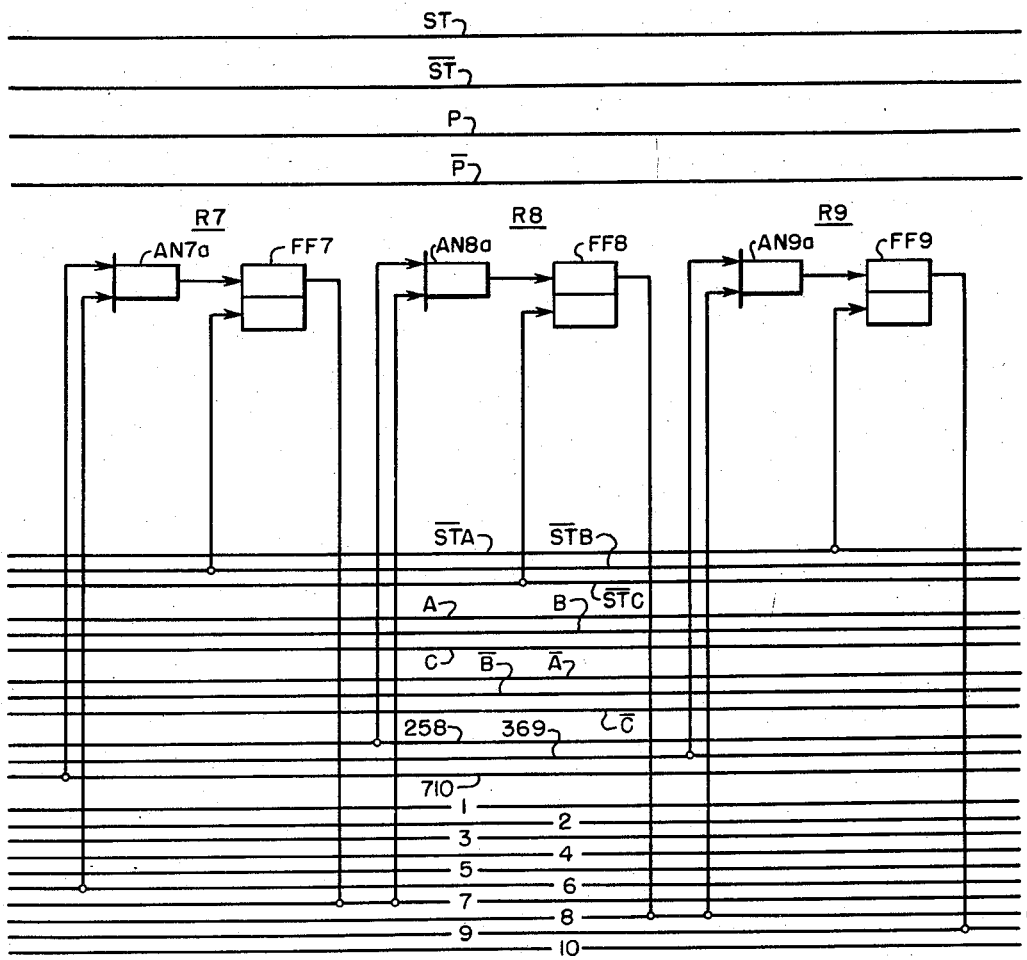

Referring to Fig. 5, a schematic diagram of Flip-Flop is shown. This circuit is described in detail in patent application Serial No. 511,506, filed May 27, 1955, by Robert A. Ramey and William G. Hall. This circuit comprises a pair of saturable magnetic cores 45 and 46 having output windings 47 and 48 thereon connected to the secondary winding 49 of a transformer 50 and through rectifier devices 51 and 52 to an output resistor 53. Reset windings 55 and 56 are also disposed on the core members and connected to the secondary winding 57 of the transformer 50. These windings are connected through non-linear circuits comprising rectifiers 58 and 59 and resistors 60 and 61 to a battery 62 for providing a magnetizing reset current. An on terminal 64 is provided for applying a signal to the non-linear circuit 58—60 to prevent resetting and produce an output signal at the output terminal 65. Memory circuits comprising resistors 66 and 67 are connected from the output windings 47 and 48 to the non-linear circuit resistors 60 and 61 for blocking reset and maintaining the output even though the initiating signal is removed from the terminal 64. An off terminal 66 is provided for applying a signal to effect reset of the magnetic cores 45 and 46 and remove the output signal from the terminal 65.

Figure 6:
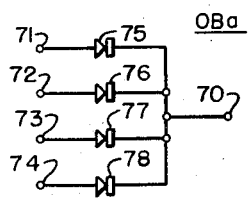
Fig. 6 is a schematic diagram of an Or circuit such as used in the circuit of Figs. 1A-1F.
Figure 7A:
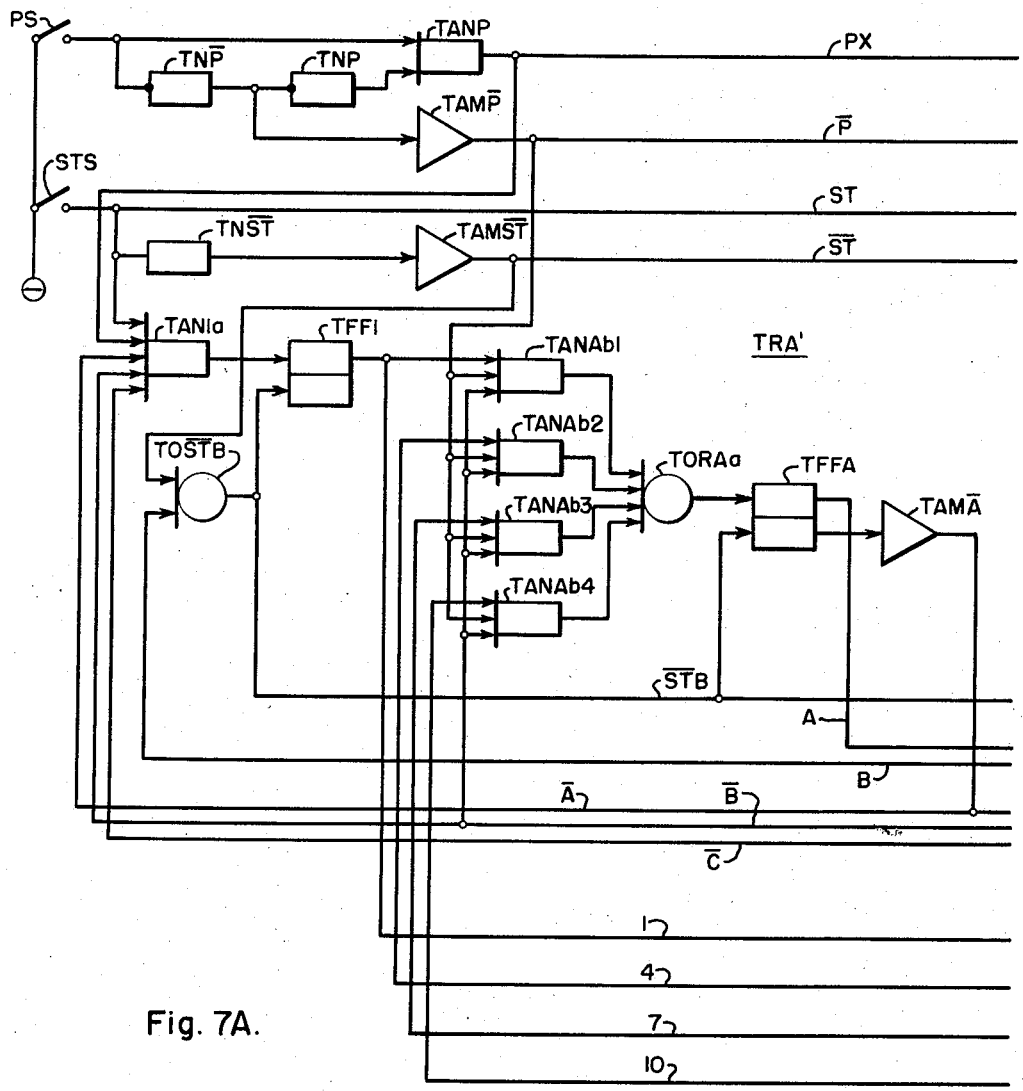

Referring to Fig. 6, it will be seen that a typical Or circuit OB*a* comprises a single output terminal 70 which is connected to a plurality of input terminals 71, 72, 73 and 74 through rectifier devices 75, 76, 77 and 78, respectively, though the input signal applied to any one of the input terminals will produce an output signal. This Or circuit is typical of any of the Or circuits shown in Fig. 1, differences being only in the number of input terminals, which may be varied to suit the occasion.

In detail, the operation of the register shown in Figs. 1A through 1F is as follows. When the pulse signal P first occurs, it is applied to the And circuit AN1*a* together with the start signal ST. Because the transfer Flip-Flop circuits FFA, FFB and FFC will be in the off condition, Not signals $\overline{A}$, $\overline{B}$ and $\overline{C}$ exist and are also applied to this And circuit. An output signal therefore occurs at AN1*a* which is applied to Flip-Flop FF1, triggering it to the on condition and applying an output signal to the signal 1 bus. This signal operates relay 1R to light lamp L1. Signal 1 is applied to the Or circuit OA*a*, and when the first pulse terminates, the Not element NP produces a Not signal $\overline{P}$. This signal, together with the output of the Or circuit OA*a* and the $\overline{B}$ signal, effects operation of the And circuit ANA*b* to apply a signal to the transfer Flip-Flop FFA, triggering it to the on condition. This causes the output signal of the Not circuit NA to terminate. The first pulse is now registered.

For the second pulse signal P is again established, signals P, ST, $\overline{B}$, $\overline{C}$ and A trigger And circuit AN258, and apply an output signal to the And circuit AN2*a* of register stage R2. This signal, together with signal 1, effects operation of AN2*a*, thus applying a signal to Flip-Flop FF2 triggering it to the on condition so as to produce an output signal which is applied to the signal 2 bus. The application of signal 2 to Or circuit OB*a* casuses it to apply a signal to the And circuit ANB*b* of transfer stage TRB. When the second pulse terminates, a $\overline{P}$ signal is also applied to this And circuit together with a $\overline{C}$ signal causing it to trigger the Flip-Flop FFB to the on condition. The B signal is applied the Not circuit NB to interrupt the $\overline{B}$ signal, and it is also applied to the Or circuit O$\overline{ST}$B to produce an output for turning the Flip-Flop FF1 off, thus terminating the 1 signal. Termination of $\overline{B}$ signal turns AN258 off.

Recurrence of the pulse P for the third pulse, together with the start signal ST, the $\overline{C}$ signal from NC and the B signal from FFB, produces an output from And circuit AN369. This is applied to AN3a along with the signal 2 to trigger Flip-Flop FF3. The 3 signal operates OR element OCa to apply signal Ca to And circuit ANCb. The $\overline{P}$ signal occurring at the end of the third pulse and the $\overline{A}$ signal resulting from A being turned off by the B signal cause Flip-Flop FFC to be triggered and produce the C signal. This signal applied to the Or circuit OSTC produces an output which is applied to the Flip-Flop FF2 to turn it off and terminate the 2 signal. Loss of the $\overline{C}$ signal turns AN369 off.

Register stage R4 is activated by the ST, P and C signals operating And circuit AN710. The output from AN710 together with the 3 signal, triggers AN4a and operates FF4 to produce the 4 signal. The 4 signal triggers OAa, and the output therefrom, together with the P signal at the end of pulse 4 and the $\overline{B}$ signal, trigger ANAb to operate FFA to indicate the end of the fourth pulse. The operation of stages 5 through 10 follows the pattern hereinbefore described. Signals $\overline{STB}$, A, B, $\overline{A}$, $\overline{C}$, ST, $\overline{ST}$, P, $\overline{P}$, 1, 4, 7 and 10 are all used in succeeding stages.

Referring to Figs. 7A through 7F, a decimal pulse register is shown schematically utilizing transistor logic elements instead of magnetic amplifier elements. Basically, the arrangement is the same as for Figs. 1A to 1F, and the register comprises ten register stages TR1 through TR10 which are successively operated by pulse signals for operating relays 1R through 10R to energize indicating lamps 1L through 10L. Because of the operating characteristics of the transistors, several changes are necessary in the circuit arrangements. For example, amplifiers AM1 through AM10 are utilized to amplify the output signals of the register stages for operating the relays 1R through 10R. In addition, amplifiers $\overline{TAMA}$, $\overline{TAMB}$ and $\overline{TAMC}$ are utilized to amplify the off or Not signals of the transfer Flip-Flop circuits TFFA, TFFB and TFFC, respectively.

Because of the relatively short switching time of transistor logic elements, the input signal P derived from the connection to the negative terminal of a D.-C. source through the pulsing switch PS, is not fed directly to the P bus as in Fig. 1 but is instead applied to a PX bus through an And circuit TANP which is energized at one input terminal directly by the pulse signal and at the other input terminal by having the pulse signal applied in succession to two Not circuits $\overline{TNP}$ and TNP, so as to produce an intentional delay between the occurrence of the PX and $\overline{P}$ signals. The output from the Not circuit $\overline{TNP}$ is applied to $\overline{P}$ bus through an amplifier $\overline{TAMP}$.

The start signal ST is shown as produced by connecting the ST bus to a negative terminal of a source through a switch STS. The $\overline{ST}$ signal is produced by applying the start signal to a Not circuit $\overline{TNST}$ and applying it to the ST bus through an amplifier $\overline{TAMST}$.

The register stages TR1 through TR10, which apply the pulse signals 1 through 10 to the relays 1R through 10R, are substantially identical with the register stages of Fig. 1, but because of the circuitry of the transistor logic elements which does not permit the use of Or to And circuit connections, the transfer stages TRA', TRB' and TRC' are rearranged so that a plurality of And circuits feed into each Or circuit so as to eliminate the Or to And circuit arrangements of Fig. 1. For example, And circuits TANAb1 through TANAb4 feed into the Or circuit TORAa. Likewise, And circuits TANBb1 through TANBb3 feed into Or circuit TORBa, and And circuits TANCb1 through TANCb3 feed into Or circuit TORCa. Register stages TR4 through TR10 are basically similar to the corresponding stages of Fig. 1 except they comprise transistor logic elements. And circuits TAN258, TAN369 and TAN710 which are transistor circuits corresponding to the similar circuits of Fig. 1, are likewise used with register stages 3, 4 and 7 as well as with the succeeding stages and sequence, as in the circuit of Fig. 1.

Referring to Fig. 8, the circuitry of the Not element $\overline{TNP}$ is shown in detail, and comprises a transistor T1 having its emitter e grounded and its base electrode b connected to an input terminal 75 for rendering the transistor conductive in response to the application of a negative signal. A battery 76 is connected to the base electrode b to make the base electrode positive and normally bias the transistor to cut off. The collector c is connected to the negative terminal of a 45 volt battery 78 and to an output terminal 79 for producing an output signal when the transistor T1 is cut off. A clamping diode 80 connects the output terminal to a 15 volt battery 81. Whenever a negative signal is applied to the input signal 75, the base b is made negative, and the transistor T1 saturates connecting the collector c to ground so as to drop the output voltage of the output terminal 79.

Referring to Fig. 9, the And circuit shown corresponds to that of TANAb1 which has an output terminal 83 connected to a battery 84 by a clamping diode 85 and connected to the negative terminal of a battery 86 through a resistor 87. Input terminals 88, 89 and 90 are connected to the output terminal 83 through diodes 91, 92 and 93 for grounding the output terminal when no signal is applied, thus preventing any output. Signals must be applied to all of the input terminals to prevent grounding the output terminal for obtaining an output.

Referring to Fig. 10, an Or circuit is illustrated, such as the Or circuit TORBa which has three input terminals 94, 95 and 96 and a single output terminal 97. The input terminals are connected to the output terminal through rectifier devices 98, 99 and 100 so that a negative signal on any one of the inputs produces a negative signal on the output terminal.

Fig. 11 is a schematic diagram of a transistor Flip-Flop circuit, such as circuit TFFA. Transistors T2 and T3 have their emitters e connected to ground, and have their base electrodes b and collectors c cross-connected through resistors 102 and 103. A capacitor 104 is connected between the base electrode of transistor T3 and the battery source 105 so that when the Flip-Flop is first energized, the charging current of the capacitor will saturate the transistor T3 so that the on output terminal 106 is effectively grounded and no on signal is obtained. Transistor T2 remains unsaturated so that the off output terminal 107 is substantially the full negative potential of the battery 105 and provides an off signal. The clamping diodes 108 and 109 connect the output terminals to ground through a 15 volt battery 110. The base electrodes b are normally biased positive by a battery 112, and on and off input terminals 114 and 115 are connected to the base electrodes of transistors T2 and T3, respectively, for triggering the Flip-Flop to the on and off condition in response to application of negative signals.

Referring to Fig. 12, a diagrammatic circuit of a signal amplifier, such as TAMA, is shown which comprises basically a Not amplifier. For example, transistors T4 and T5 are connected in cascade so that a signal applied to the input terminal 117 at the base b of transistor T4 causes T4 to saturate and connect the base b of transistor T5 to ground. This causes transistor T5 to block, so that the output terminal 118 is raised to substantially the negative voltage of the battery source 120 to provide an output signal. A battery 121 normally biases the base electrodes of the transistors positive, and the clamping diodes 122 and 123 connect the collectors $c$ to ground through a 15 volt battery 125.

In Fig. 13 there is shown a relay amplifier TAM1 comprising an input terminal 127 connected to the base electrode $b$ of a transistor T6 for effecting saturation thereof in response to the application of a negative signal. The base $b$ of a transistor T7 is connected to the emitter $e$ of transistor T6 for supplying base current to the transistor T7 whenever transistor T6 is saturated. Transistor T7 likewise has its emitter $e$ connected to the base electrode $b$ of an output transistor T8 for rendering it conductive to provide an output signal at the output terminals 128 and 129 for operating a relay or the like.

In operation the register of Figs. 7A through 7F is substantially identical with that of Figs. 1A through 1F, so that an output signal occurs from each register stage in succession as pulse signals are applied and so long as the start signal is continued. Reset is occasioned in the register of either Fig. 1 or Fig. 7 upon termination of the start signal, since the $\overline{ST}$ signal is applied directly to reset the Flip-Flops.

From the above description and the accompanying drawings, it will be apparent that we have provided in a simple and effective manner for counting successive pulses in a decimal system by using static logic circuit elements. A register embodying the features of our invention is simple and inexpensive to manufacture and is extremely compact and reliable in operation. The energy requirements are extremely low enabling the units to be completely sealed so as to withstand severe temperature and weather conditions.

Since certain changes may be made in the above construction and different embodiments of the invention may be made without departing from the scope thereof, it is intended that all matter contained in the above description or shown in the accompanying drawings shall be interpreted as illustrative and not in a limiting sense.

We claim as our invention:

1. In a decimal pulse register, a plurality of register stages each comprising a static Flip-Flop memory circuit having two stable conditions and an And circuit having a plurality of input circuits and an output circuit connected to trigger the Flip-Flop to one of said conditions, circuit means connected to different input circuits of each And circuit to apply a continuous start pulse and successive pulse signals thereto, a transfer Flip-Flop circuit, means applying a signal to the transfer Flip-Flop circuit on cessation of a pulse signal, and means connecting the transfer Flip-Flop circuit to a subsequent register stage for applying a signal thereto in conjunction with a subsequent pulse signal.

2. A decimal pulse register comprising, a plurality of register stages each comprising a register Flip-Flop having two stable conditions in one of which a register output is provided, and And circuit having an output circuit connected to each register Flip-Flop to trigger said Flip-Flop to said one condition, circuit means connected to apply a continuous start signal and a plurality of consecutive pulse signals to each And circuit, a transfer Flip-Flop having two stable conditions connected to apply in one of said conditions a signal to the And circuit of a subsequent register stage, and circuit means connecting the register Flip-Flop of said subsequent register stage to apply a reset signal to the register Flip-Flop of the first register stage and the transfer Flip-Flop to trigger them to their other stable conditions.

3. A pulse register comprising, a plurality of pulse register stages each including a Flip-Flop memory circuit having two stable conditions in one of which it produces an output signal, means for applying to one of said Flip-Flop memory circuits signals including a continuous start signal and a first pulse signal for triggering said Flip-Flop to said one stable condition, an additional Flip-Flop transfer circuit, means for producing a Not signal in response to termination of said first pulse signal, circuit means connected to apply the output signal and the Not signal to the transfer Flip-Flop circuit to produce a transfer output signal, and means connecting the next register stage Flip-Flop memory circuit to the transfer circuit to trigger said next register stage Flip-Flop circuit to apply thereto a succeeding pulse signal and the transfer Flip-Flop output signal to trigger said next register stage to produce an output signal.

4. In a pulse register, a plurality of register stages each comprising a static Flip-Flop memory circuit having two stable conditions and an And circuit having a plurality of input circuits and an output circuit connected to trigger said Flip-Flop to one of said conditions in which it provides an output signal, a plurality of transfer means each comprising a static Flip-Flop memory circuit having an input circuit energizable to trigger the Flip-Flop to apply an on output signal to the And circuit of the next register stage and an And circuit having a plurality of inputs and an output circuit connected to the transfer Flip-Flop input circuit, Not means connected to each transfer Flip-Flop to produce a signal when the transfer Flip-Flop is triggered to the off condition, circuit means connected to apply a continuous start signal and a plurality of successive pulse signals to each register And circuit, circuit means connecting the Not means to apply signals to different ones of the register And circuit, and means connected to reset each register And circuit in response to operation of a subsequent transfer Flip-Flop.

5. In a pulse register, a plurality of register stages each comprising a Flip-Flop and an And circuit connected to effect operation of its Flip-Flop to register a particular pulse count, means connected to apply a continuous start signal and a plurality of consecutive pulse signals to each And circuit, transfer means comprising a Flip-Flop and an And circuit connected to predetermined ones of the register And circuits to operate and apply a signal to a succeeding register And circuit, upon the termination of a pulse registered by the preceding register circuit, and means including a Not circuit connected to each transfer Flip-Flop to apply a signal to the And circuit of the preceding register circuit only when the transfer Flip-Flop is not operated.

6. In a pulse register, a plurality of consecutive register stages each comprising a static Flip-Flop memory circuit having two stable conditions and an And circuit having a plurality of input circuits and an output circuit connected to trigger the Flip-Flop to one of said conditions, circuit means connected to the And circuit to apply both a continuous start signal and a plurality of consecutive pulse signals to each of said And circuits, a Not static circuit element operable to produce a signal in the absence of said pulse signals, and transfer means including a Flip-Flop memory circuit and an And circuit responsive to triggering of the preceding register Flip-Flop and said Not signal to set up the succeeding register Flip-Flop to be triggered by the next pulse signal.

7. A pulse register comprising, a plurality of register circuits each including a static Flip-Flop memory circuit and an And circuit connected to effect operation of its Flip-Flop circuit, circuit means connected to apply to each And circuit a continuous start signal and a plurality of pulse signals to be registered, a plurality of transfer means each comprising a transfer Flip-Flop memory circuit connected to the And circuit of a subsequent register And circuit and having an And circuit connected to effect operation thereof, and a static Not circuit connected to produce a signal only when the transfer Flip-Flop is not operated, a Not circuit operable to produce a signal when the start pulse terminates connected to effect reset of the register Flip-Flop circuits, another Not circuit operable to produce a signal when each pulse signal is terminated connected to apply said signal to the transfer And circuits, circuit means connecting the transfer Not circuits to the first register And circuit, additional circuit means connecting to the first transfer And circuit the first register Flip-Flop circuit, the signal pulse Not circuit and the second transfer Not circuit to effect operation of the first transfer Flip-Flop circuit.

8. In combination, a plurality of register circuits each comprising a register Flip-Flop and an And circuit for triggering the Flip-Flop, circuit means connected to apply to each of the And circuits both a continuous start signal and a plurality of successive pulse signals to be registered, a Not circuit operable to produce a signal in the absence of the start signal to reset the Flip-Flop, a transfer Flip-Flop circuit connected to apply a signal to the And circuit of a succeeding register stage, an And circuit connected to trigger the transfer Flip-Flop, Not means producing a signal in the absence of a pulse signal, and means connected to apply the Not pulse signal, and a signal from the preceding register Flip-Flop to the transfer Flip-Flop.

9. In a pulse register, a plurality of consecutive register stages each including a Flip-Flop memory circuit having an And circuit connected to apply thereto a signal to effect operation of said Flip-Flop, means connected to apply to said And circuit simultaneously continuous and consecutive pulse signals, transfer means including a Flip-Flop circuit connected to apply a signal to the And circuit of a subsequent register stage and an And circuit connected to effect operation of the transfer Flip-Flop circuit in response to a signal from a previous register Flip-Flop, a signal from a subsequent transfer Flip-Flop and the termination of a pulse signal, an additional And circuit connected to effect operation of the And circuit of predetermined ones of the register stages including the next one in response to operation of the Flip-Flop of the preceding register stage, said continuous and pulse signals being applied to the register stages after the first one through said additional And circuits.

10. In a register, a plurality of register stages each comprising a Flip-Flop memory circuit having an And circuit connected to effect operation thereof, transfer means for effecting consecutive operation of said register stages and comprising a Flip-Flop having on and off output signals, And circuit means connected to effect operation of the transfer Flip-Flop to the on condition and an Or circuit connected to reset the transfer Flip-Flop to the off condition, means producing a plurality of consecutive pulses and a continuous start signal, means operated by each of said consecutive pulses to produce separated pulse and Not pulse signals respectively during the absence of each of said consecutive pulses, means operated by the start signal to produce a Not start signal separate from and in the absence of the start signal, circuit means connected to apply the start pulse signals to predetermined ones of the register And circuits, additional circuit means connected to apply the Not pulse signals to the transfer And circuits, and circuit means connecting the And circuits of predetermined ones of the register stages to the And circuits of predetermined other register stages.

No references cited.